(12) United States Patent
Junghans et al.

(10) Patent No.: US 6,298,948 B1
(45) Date of Patent: Oct. 9, 2001

(54) CENTRAL LUBRICATION SYSTEM FOR A ROTARY PRINTING PRESS

(75) Inventors: Rudi Junghans, Wilhelmsfeld; Mathias Zuber, Helmstadt-Bargen, both of (DE)

(73) Assignee: Heidelberger Druckmaschinen AG, Hejdelberg (DE)

( * ) Notice: Subject to any disclaimer, the term of this patent is extended or adjusted under 35 U.S.C. 154(b) by 54 days.

(21) Appl. No.: 09/033,145

(22) Filed: Mar. 2, 1998

(30) Foreign Application Priority Data

Mar. 1, 1997 (DE) .................................. 297 03 781
Jul. 30, 1997 (DE) .................................. 197 32 819

(51) Int. Cl.[7] ........................................ F01M 11/10
(52) U.S. Cl. ......................... 184/6.1; 101/216; 210/96.1
(58) Field of Search ............... 184/6.1, 6.4, 108; 101/216; 324/204, 664, 694, 697, 698; 73/19.11, 53.05, 61.44; 137/172; 210/96.1, 112, 114

(56) References Cited

U.S. PATENT DOCUMENTS

| | | | |
|---|---|---|---|
| 4,014,791 | * 3/1977 | Tuttle | 210/114 |
| 4,129,501 | * 12/1978 | Haynes | 324/698 |
| 4,267,722 | * 5/1981 | Hendry | 73/53.05 |
| 4,497,714 | * 2/1985 | Harris | 210/114 |
| 4,528,094 | * 7/1985 | Scragg | 210/114 |
| 4,537,211 | * 8/1985 | Almeida | 137/172 |
| 4,924,695 | * 5/1990 | Kolpak | 73/61.44 |
| 4,967,880 | * 11/1990 | Krambs | 184/6.4 |
| 5,417,107 | * 5/1995 | Biencourt et al. | 73/61.44 |
| 5,471,927 | * 12/1995 | Frank et al. | 101/216 |
| 5,565,094 | * 10/1996 | Zoch et al. | 184/6.11 |
| 5,694,848 | * 12/1997 | Palmatier | 101/219 |

* cited by examiner

Primary Examiner—David A. Bucci
Assistant Examiner—Chong H. Kim
(74) Attorney, Agent, or Firm—Herbert L. Lerner; Laurence A. Greenberg; Werner H. Stemer

(57) ABSTRACT

A central lubrication system for a rotary printing press with a central supply of lubricant for individual lubricating points and with a line system for feeding an oversupply of lubricant to the individual lubricating points, the excess lubricant being returned and tested for water content and, if water is present, the printing press being shut down, includes a test box connected, upstream of the central supply, in the line system for returning the lubricant, a sensor received in the test box, an inlet for the line system and an outlet formed in the test box so that the lubricant is able to circulate about the sensor in the test box between the inlet and the outlet thereof.

5 Claims, 2 Drawing Sheets

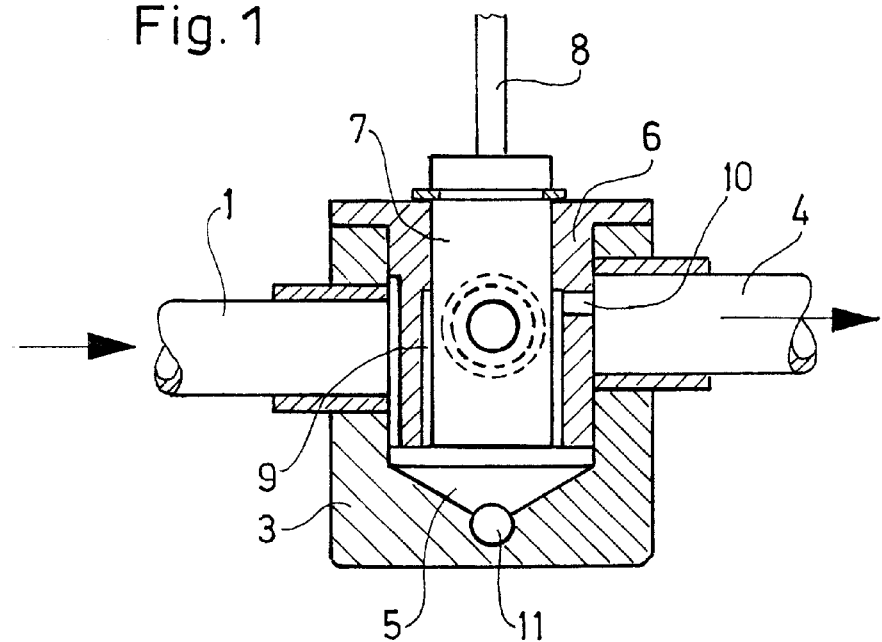
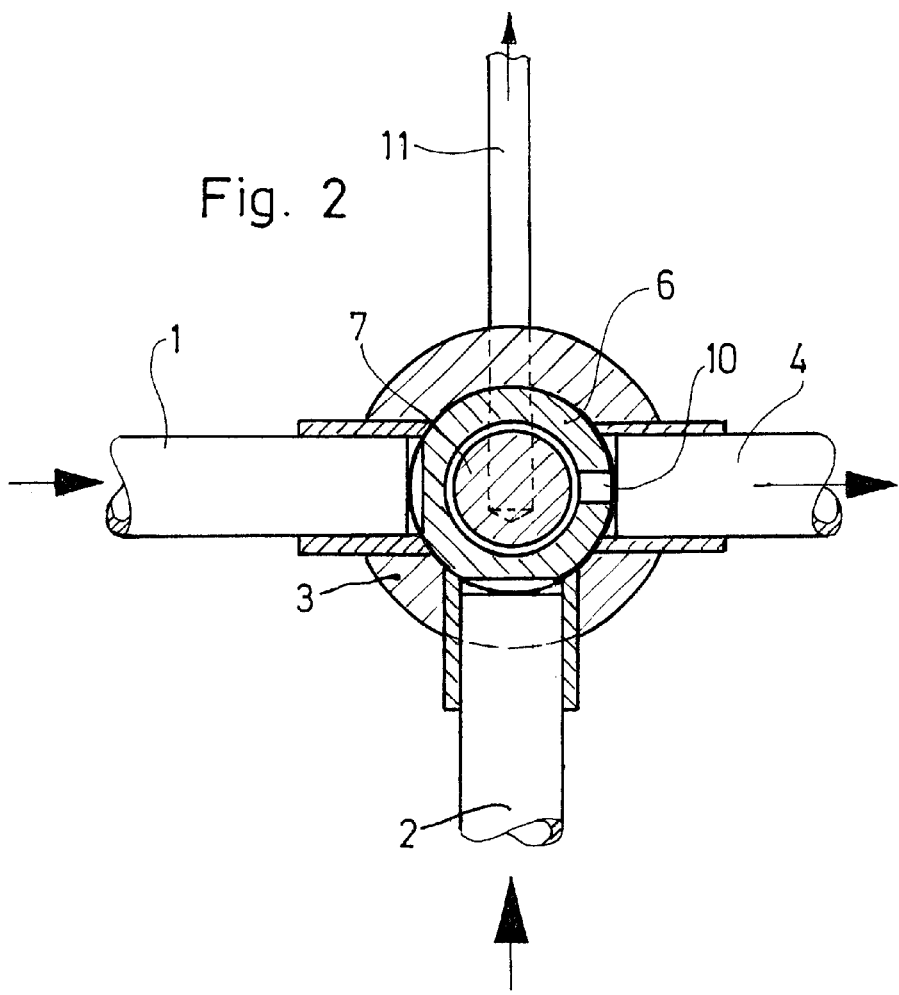

CENTRAL LUBRICATION SYSTEM FOR A ROTARY PRINTING PRESS

BACKGROUND OF THE INVENTION

FIELD OF THE INVENTION

The invention relates to a central lubrication system for a rotary printing press and, more particularly, to a central lubrication system with a central supply of lubrication for individual lubrication points and with a pipeline system for feeding an oversupply of lubrication to the individual lubrication points, the excess lubrication being returned and tested for water content and, if water is present, the printing press being shut down.

For such presses, a multiplicity of bearing points, tooth meshings, cam transmissions and the like are in existence which are supplied with a required quantity of lubrication in accordance with an individual lubrication chart during the operation of the press. Through the targeted supply of the individual lubricant points, only a relatively small quantity of lubricating oil has to be fed to the moving parts. In this regard, the supply of lubricant is always slightly greater than the required amount, which may involve only a few drops of lubricating oil, depending upon the respective lubricating point. This relatively small amount of oversupply of oil then drips or flows from the individual lubricating points and is collected in oilways or oil grooves or in other oil flow collector vessels. When, however, rollers of the inking unit in specific units of rotary printing presses, for example, in printing units, can be provided, it is not possible to exclude the occurrence of leakage losses in coolant feed lines which are present. If water is used as the coolant, one cannot reliably exclude the possibility that a few drops of water will not leak out over a long operating period of the press. This water, in droplet form, gets into the outwardly flowing or dripping lubricating oil and is fed together therewith to the central oil container. The danger then arises that the oil in the supply container of the central lubrication system may become nonusable. In this case, the parts of the press to be lubricated by the supplied water-oil mixture during the operation of the press may become damaged. Heretofore, this could only be prevented reliably if, for example, in the oil collecting vessel, another smaller oil container is provided wherein a signal is released by a sensor if water is present in the supplied oil (note published German Patent Application DE 38 43 498 C1). This additional container was to be removed manually and emptied, however, when the presence of water was detected, the oil normally found above the water being thereby lost.

SUMMARY OF THE INVENTION

It is accordingly an object of the invention to provide a central lubrication system for a rotary printing press wherein, already upon the appearance of small quantities of water, a signal is released and/or the press is shut down.

With the foregoing and other objects in view, there is provided, in accordance with the invention, a central lubrication system for a rotary printing press with a central supply of lubricant for individual lubrication points and with a line system for feeding an oversupply of lubricant to the individual lubrication points, the excess lubricant being returned and tested for water content and, if water is present, the printing press being shut down, comprising a test box connected, upstream of the central supply, in the line system for returning the lubricant, a sensor received in the test box, an inlet for the line system and an outlet formed in the test box so that the lubricant is able to circulate about the sensor in the test box between the inlet and the outlet thereof.

In accordance with another feature of the invention, the central lubrication system includes a water drain located in a lower part of the test box.

In accordance with a further feature of the invention, the central lubrication system includes a plurality of inlets formed in the test box.

In accordance with an added feature of the invention, the central lubrication system includes an outlet formed in an upper region of the test box.

In accordance with a concomitant feature of the invention, the test box is located at a lowermost location of the line system.

With the foregoing construction in accordance with the invention very small quantities of water are detected beforehand in the lubricant and result in a shutdown of the printing press, the water in a lower part of the test box being thus able to be removed.

In an advantageous construction according to the invention, a water drain is provided in a lower part of the test box. The instant a signal is given, the operating personnel need only open the water drain and remove the water, so that, after disposing of the disruption, the printing press can be set in operation again.

In another advantageous construction according to the invention, a plurality of inlets are formed in the test box, so that the test box can serve simultaneously as a pipe coupling or joint connection.

In a further advantageous construction according to the invention, an outlet is formed in an upper region of the test box, so that the sensor always dips into or is immersed in the lubricant. It is also advantageous to locate the test box at a lowermost location of the line system, so that occurring water is easily collected thereat.

Other features which are considered as characteristic for the invention are set forth in the appended claims.

Although the invention is illustrated and described herein as embodied in a central lubrication system for a rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWING

FIG. 1 is a longitudinal sectional view of a test box constructed in accordance with the invention; and FIG. 2 is a cross-sectional view of FIG. 1.

DESCRIPTION OF THE PREFERRED EMBODIMENT

Figure 3:
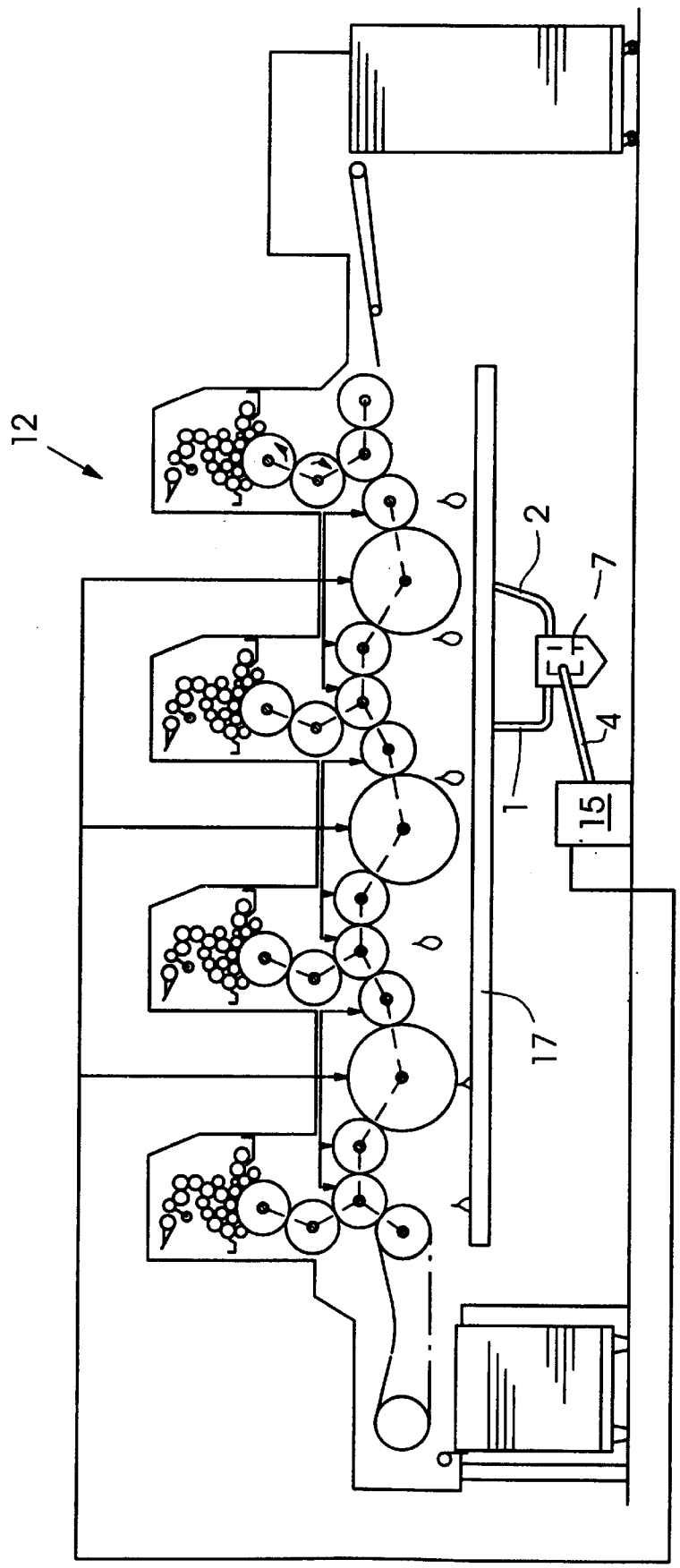
FIG. 3 is a side-elevational view of a printing press.

Referring now to the figures of the drawing, there is shown therein lines 1 and 2 for returning lubricant, which terminate in a test box 3 disposed within the central lubricating line system in a rotary printing press. Excess lubricant is then fed back from the test box 3 into a central supply, such as a lubricating oil tank, for example, via a line 4. A non-illustrated suction pump may be post-connected to the test box for sucking out the excess lubricating oil.

The test box 3 has an inner chamber 5 closed by a sleeve or bushing 6. A sensor 7 is inserted into the bushing 6 and, when water appears in the lubricant, via a lead line 8, transmits a signal, for example, for shutting down the press. Between the sensor 7 and the bushing 6, a free space 9 is formed in a lower region of the latter, the lubricant being returned via the lines 1 and 2 arriving in the free space 9 and passing or circulating around the sensor 7. The lower part of the inner chamber 5 is accordingly filled with lubricant which is then sucked out of a bore 10 and the line 4. The sensor 7 thus dips into the lubricant and, when water appears, emits a signal.

If drops of water due to water leakage are contained in the returned excess lubricant, the water constituent of the lubricant collects in the lower region of the inner chamber 5. In this case, the sensor 7 has already transmitted a signal to the printing-press control system. The operating personnel must then merely let the water run off via a drain or outlet 11 from the test box 3 and the inner chamber 5 thereof, respectively, so that the sensor 7 detects no more of the water constituent, and the printing press can be set into operation again. During normal operation, the water drain or outlet 11 is closed. It is accordingly advantageous for the test box 3 to be located at the lowest point of the line system 1, 2, so that when a quantity of water appears in the lubricant, the water can accumulate at the lowest location, and the sensor responds reliably.

FIG. 3 shows a rotary printing press 12 with a central supply 15, a line system 16 for feeding an oversupply of lubricant to the individual lubricating points and a lubricant return system including a lubricant flow collector vessel 17 and return lines 1, 2, for returning the excess lubricant to the central supply 15. A sensor 7 for testing the lubricant for water is upstream of the central supply 15.

We claim:

1. A central lubrication system for a rotary printing press where water will enter the lubrication system only in exceptional circumstances, comprising:

a central supply of lubricant for individual lubricating points;

a line system for feeding an oversupply of lubricant to the individual lubricating points;

a lubricant return system for returning the excess lubricant;

a test box connected, upstream of the central supply, to the lubricant return system;

a sensor received in said test box, said sensor in said test box constantly testing the lubricant for the presence of a certain percentage of water in the lubricant;

an inlet formed in said test box, said inlet connected to the lubricant return system; and an outlet formed in said test box so that the lubricant is able to circulate about said sensor in said test box between said inlet and said outlet thereof.

2. The central lubrication system according to claim 1, including a drain located in a lower part of said test box.

3. The central lubrication system according to claim 1, including a plurality of inlets formed in said test box.

4. The central lubrication system according to claim 1, wherein said outlet is formed in an upper region of said test box.

5. The central lubrication system according to claim 1, wherein said test box is located at a lowermost location of the line system.

* * * * *